(12) United States Patent
Ward et al.

(10) Patent No.: US 9,873,239 B2
(45) Date of Patent: *Jan. 23, 2018

(54) PROCESS FOR FABRICATING POLYMERIC ARTICLES

(71) Applicant: PROPEX OPERATING COMPANY, LLC, Chattanooga, TN (US)

(72) Inventors: Ian MacMillan Ward, Leeds (GB); Peter John Hine, Leeds (GB); Keith Norris, Keighley (GB)

(73) Assignee: Propex Operating Company, LLC, Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,277

(22) Filed: Jun. 28, 2016

(65) Prior Publication Data
US 2016/0303835 A1    Oct. 20, 2016

Related U.S. Application Data

(60) Continuation of application No. 14/502,377, filed on Sep. 30, 2014, now Pat. No. 9,403,341, which is a
(Continued)

(30) Foreign Application Priority Data

May 22, 2003 (GB) .................................. 0311819.7
May 25, 2003 (EP) .................................... 03253211

(51) Int. Cl.
*B32B 7/02* (2006.01)
*B32B 27/08* (2006.01)
(Continued)

(52) U.S. Cl.
CPC ............ *B32B 27/08* (2013.01); *B29C 43/003* (2013.01); *B29C 43/006* (2013.01);
(Continued)

(58) Field of Classification Search
CPC ... B29C 43/003; B29C 43/006; B29C 43/203; B32B 27/32; B32B 27/08; B32B 5/26;
(Continued)

(56) References Cited

U.S. PATENT DOCUMENTS 2,864,151 A * 12/1958 Bihaly ................... D06M 17/00
428/374
3,231,650 A * 1/1966 Findlay .................... D04H 1/54
156/305
(Continued)

*Primary Examiner* — Seyed Masoud Malekzadeh
(74) *Attorney, Agent, or Firm* — Husch Blackwell LLP

(57) ABSTRACT

A process for the production of a polymeric article directed to (a) forming a ply having successive layers, namely, (i) a first layer made up of strands of an oriented polymer material; (ii) a second layer of a polymeric material; (iii) a third layer made up of strands of an oriented polymeric material, wherein the second layer has a lower peak melting temperature that of the first and third layers; (b) subjecting the ply to conditions of time, temperature, and pressure sufficient to melt a proportion of the firsts layer to melt the second layer entirely, and to melt a proportion of the third layer, and to compact the ply; and (c) cooling the compacted ply. The resultant articles have good mechanical properties yet may be made at a lower compaction temperature than articles not employing the second layer, leading to a more controllable manufacturing process.

6 Claims, 19 Drawing Sheets

Related U.S. Application Data continuation of application No. 13/561,330, filed on Jul. 30, 2012, now Pat. No. 8,871,333, which is a continuation of application No. 13/276,118, filed on Oct. 18, 2011, now Pat. No. 8,268,439, which is a division of application No. 10/556,402, filed as application No. PCT/GB2004/002184 on May 21, 2004, now Pat. No. 8,052,913.

(51) Int. Cl.
| | |
|---|---|
| *B29C 43/00* | (2006.01) |
| *B29C 43/20* | (2006.01) |
| *D04H 1/559* | (2012.01) |
| *D04H 13/00* | (2006.01) |
| *B32B 5/26* | (2006.01) |
| *B32B 27/32* | (2006.01) |
| *B29C 43/52* | (2006.01) |
| *B32B 5/02* | (2006.01) |
| *B32B 27/36* | (2006.01) |
| *B29K 105/00* | (2006.01) |
| *B29K 105/06* | (2006.01) |
| *B29K 105/08* | (2006.01) |
| *B29L 9/00* | (2006.01) |

(52) U.S. Cl.
CPC ............ *B29C 43/203* (2013.01); *B29C 43/52* (2013.01); *B32B 5/024* (2013.01); *B32B 5/26* (2013.01); *B32B 27/32* (2013.01); *B32B 27/36* (2013.01); *D04H 1/559* (2013.01); *D04H 13/00* (2013.01); *B29K 2105/0079* (2013.01); *B29K 2105/06* (2013.01); *B29K 2105/0854* (2013.01); *B29K 2105/256* (2013.01); *B29L 2009/00* (2013.01); *B32B 2250/03* (2013.01); *B32B 2250/20* (2013.01); *B32B 2250/24* (2013.01); *B32B 2250/242* (2013.01); *B32B 2250/40* (2013.01); *B32B 2262/0253* (2013.01); *B32B 2262/0284* (2013.01); *B32B 2307/536* (2013.01); *B32B 2323/04* (2013.01); *B32B 2323/10* (2013.01); *Y10S 428/91* (2013.01); *Y10T 428/2495* (2015.01); *Y10T 428/24628* (2015.01); *Y10T 428/24942* (2015.01); *Y10T 428/24992* (2015.01); *Y10T 428/249998* (2015.04); *Y10T 428/31504* (2015.04)

(58) Field of Classification Search
CPC .......... B32B 2323/04; B32B 2307/536; B32B 2262/0253; B32B 2250/40; B32B 2323/10; B32B 2250/20; B32B 2250/03; B32B 2250/242; B32B 2250/24; B29K 2105/0079; B29K 21/06; B29K 2105/0854; B29K 2105/256; B29K 2105/06; D04H 1/559; D04H 13/00; Y10T 428/2495; Y10T 428/31504; Y10T 428/249998; Y10T 428/24628; Y10T 428/24942; Y10S 428/91; B29L 2009/00
USPC ........ 428/212, 32.87, 218, 322.2, 411.1, 910
See application file for complete search history.

(56) References Cited

U.S. PATENT DOCUMENTS

| | | | | |
|---|---|---|---|---|
| 3,367,926 A | * | 2/1968 | Voeks ................. | C08K 5/0008 264/331.17 |
| 3,547,768 A | * | 12/1970 | Layne ..................... | B32B 27/00 156/229 |
| 3,689,597 A | * | 9/1972 | Mahlman ................ | C08L 23/10 525/206 |
| 3,783,067 A | * | 1/1974 | Petzetakis ............... | B32B 27/00 156/162 |
| 3,884,521 A | * | 5/1975 | Moore ................... | B60R 19/42 180/219 |
| 3,920,784 A | * | 11/1975 | Nakagawa ............... | D01D 5/22 264/168 |
| 3,947,537 A | * | 3/1976 | Buntin .................... | H01M 2/14 264/134 |
| 3,962,205 A | * | 6/1976 | Ward ...................... | B29C 55/02 264/210.8 |
| 3,997,386 A | * | 12/1976 | Oshida ................... | B29C 66/71 156/309.9 |
| 4,013,816 A | * | 3/1977 | Sabee ............... | A61F 13/15203 156/167 |
| 4,048,364 A | * | 9/1977 | Harding .................. | D04H 3/16 156/244.21 |
| 4,082,731 A | * | 4/1978 | Knopka ................ | C08G 63/185 264/103 |
| 4,091,140 A | * | 5/1978 | Harmon ................... | D04H 3/16 156/167 |
| 4,110,391 A | * | 8/1978 | Berzen ................. | B29C 43/003 264/120 |
| 4,136,715 A | * | 1/1979 | McCormack ......... | B29C 70/347 138/130 |
| 4,191,718 A | * | 3/1980 | Mallick ............... | B29C 35/0288 264/236 |
| 4,228,118 A | * | 10/1980 | Wu .......................... | D01F 6/04 264/210.8 |
| 4,234,536 A | * | 11/1980 | Thiel ...................... | B29C 47/88 264/151 |
| 4,285,748 A | * | 8/1981 | Booker .................... | D01F 8/06 156/167 |
| 4,287,149 A | * | 9/1981 | Capaccio ................ | B29C 55/02 264/210.7 |
| 4,384,016 A | * | 5/1983 | Ide ........................ | B32B 27/08 156/308.2 |
| 4,403,012 A | * | 9/1983 | Harpell .................. | B32B 27/32 264/257 |
| 4,413,110 A | * | 11/1983 | Kavesh .................... | D01F 6/02 264/164 |
| 4,455,273 A | * | 6/1984 | Harpell ............... | B29C 47/0004 264/184 |
| 4,483,727 A | * | 11/1984 | Eickman .................. | D01F 6/04 156/181 |
| 4,501,634 A | * | 2/1985 | Yoshimura ............ | B29C 55/023 156/244.24 |
| 4,511,610 A | * | 4/1985 | Yazaki .................... | B32B 27/32 428/36.6 |
| 4,525,564 A | * | 6/1985 | Capaccio ................ | B29C 55/02 525/323 |
| 4,551,296 A | * | 11/1985 | Kavesh .................... | D01F 6/02 264/184 |
| 4,568,581 A | * | 2/1986 | Peoples, Jr. ............ | B29C 43/006 19/302 |
| 4,607,640 A | * | 8/1986 | McCusker ............ | A41C 3/0057 450/1 |
| 4,629,525 A | * | 12/1986 | Rasmussen ........... | B29C 55/023 156/200 |
| 4,642,153 A | * | 2/1987 | Lohr ...................... | B29C 70/504 156/296 |
| 4,647,640 A | * | 3/1987 | Capaccio ................ | B29C 55/02 526/348.1 |
| 4,668,577 A | * | 5/1987 | Ohta ...................... | D01D 10/00 264/290.5 |
| 4,786,348 A | * | 11/1988 | Luise .................... | B29C 43/006 156/181 |
| 4,792,426 A | * | 12/1988 | Greatorex ............. | B29C 43/228 264/280 |
| 4,894,281 A | * | 1/1990 | Yagi ...................... | B29C 70/04 428/298.7 |
| 4,923,660 A | * | 5/1990 | Willenberg ........... | B29C 43/006 264/103 |
| 4,931,230 A | * | 6/1990 | Krueger .................. | A61L 2/08 264/115 |

(56) References Cited

U.S. PATENT DOCUMENTS

| | | | | |
|---|---|---|---|---|
| 4,938,913 A | * | 7/1990 | Ward | B29C 47/0004 264/320 |
| 4,948,661 A | * | 8/1990 | Smith | B29C 70/467 156/182 |
| 4,990,204 A | * | 2/1991 | Krupp | B01F 13/0059 156/167 |
| 5,006,390 A | * | 4/1991 | Kavesh | B29C 70/10 428/105 |
| 5,032,339 A | * | 7/1991 | Farraye-Callahan | B29C 71/0063 264/235 |
| 5,032,399 A | * | 7/1991 | Gorbach | A61K 35/747 424/93.45 |
| 5,035,952 A | * | 7/1991 | Bruinink | F41H 5/0464 428/461 |
| 5,135,804 A | * | 8/1992 | Harpell | B29C 43/006 264/324 |
| 5,200,131 A | * | 4/1993 | Asanuma | C08J 5/18 264/210.3 |
| 5,244,482 A | * | 9/1993 | Hassenboehler, Jr. | B01D 39/163 55/528 |
| 5,324,576 A | * | 6/1994 | Reed | D04H 1/56 156/167 |
| 5,340,633 A | * | 8/1994 | van der Loo | F41H 5/0414 2/2.5 |
| 5,498,129 A | * | 3/1996 | Dequin | B64C 27/82 244/17.19 |
| 5,514,448 A | * | 5/1996 | Kishi | B29C 70/086 428/113 |
| 5,628,946 A | * | 5/1997 | Ward | A61L 27/14 156/296 |
| 5,688,426 A | * | 11/1997 | Kirkwood | B64C 1/064 219/615 |
| 5,766,725 A | * | 6/1998 | Hogenboom | B29C 65/5042 264/241 |
| 5,879,607 A | * | 3/1999 | Klocek | B29C 70/22 264/231 |
| 5,962,099 A | * | 10/1999 | Bloch | B32B 27/10 428/214 |
| 6,017,834 A | * | 1/2000 | Ward | A61L 27/14 428/198 |
| 6,107,834 A | * | 8/2000 | Dai | H03K 19/0963 326/95 |
| 6,132,657 A | * | 10/2000 | Cohen | B29B 13/007 264/120 |
| 6,168,851 B1 | * | 1/2001 | Kubota | C09J 7/0242 156/285 |
| 6,183,834 B1 | * | 2/2001 | van der Loo | B29C 70/30 264/241 |
| 6,238,768 B1 | * | 5/2001 | Van de Goot | B32B 5/12 428/113 |
| 6,268,026 B1 | * | 7/2001 | Jester | B32B 27/36 264/173.11 |
| 6,277,773 B1 | * | 8/2001 | Ward | A61L 27/14 428/198 |
| 6,312,638 B1 | * | 11/2001 | Ward | B29C 43/006 264/322 |
| 6,312,772 B1 | * | 11/2001 | Kuder | B32B 27/36 428/1.5 |
| 6,328,923 B1 | * | 12/2001 | Jones | B29B 13/08 264/322 |
| 6,458,727 B1 | * | 10/2002 | Jones | B29B 13/08 264/322 |
| 6,482,343 B1 | * | 11/2002 | Cohen | B29C 43/006 264/120 |
| 6,500,295 B1 | * | 12/2002 | Kubota | C09J 7/0242 156/269 |
| 6,713,185 B2 | * | 3/2004 | Carlson, Jr. | B32B 17/10 156/199 |
| 7,101,504 B2 | * | 9/2006 | Suzuki | D02J 1/22 226/108 |
| 7,279,441 B2 | * | 10/2007 | Jones | B29B 13/08 428/297.4 |
| 8,052,913 B2 | * | 11/2011 | Ward | B29C 43/003 156/244.26 |
| 9,403,341 B2 | * | 8/2016 | Ward | B29C 43/003 |
| 2001/0010990 A1 | * | 8/2001 | Erdos | B32B 5/26 442/394 |
| 2002/0001693 A1 | * | 1/2002 | Mokveld | B29C 70/202 428/113 |
| 2002/0016121 A1 | * | 2/2002 | Bjekovic | B29C 43/006 442/373 |
| 2002/0146563 A1 | * | 10/2002 | Risch | C08J 5/046 428/375 |
| 2004/0169304 A1 | * | 9/2004 | Ward | B29C 43/003 264/122 |
| 2004/0185732 A1 | * | 9/2004 | Bonner | B29C 43/006 442/185 |
| 2004/0213977 A1 | * | 10/2004 | Ward | A61L 27/44 428/292.1 |
| 2005/0170730 A1 | * | 8/2005 | Ward | A61L 27/44 442/365 |
| 2012/0094094 A1 | * | 4/2012 | Ward | B29C 43/003 428/212 |

* cited by examiner

PROCESS FOR FABRICATING POLYMERIC ARTICLES

CROSS-REFERENCE TO RELATED APPLICATION

This application is a continuation of co-pending application Ser. No. 14/502,377, filed Sep. 30, 2014, (now U.S. Pat. No. 9,403,341, issued Aug. 2, 2016) which is a continuation of Ser. No. 13/561,330, filed Jul. 30, 2012, (now U.S. Pat. No. 8,871,333, issued Oct. 28, 2014) which is a continuation of Ser. No. 13/276,118, filed Oct. 18, 2011, (now U.S. Pat. No. 8,268,439, issued Sep. 18, 2012), which is a divisional of application Ser. No. 10/556,402, filed on Jan. 23, 2006, (now U.S. Pat. No. 8,052,913 B2, issued Nov. 8, 2011), which is the national stage entry of PCT/GB04/02184, filed May 21, 2004, claiming priority to GB 0311819.7, filed May 22, 2003 and EP 03253211.1, filed May 25, 2003, whose disclosures are incorporated herein by reference.

The present invention relates to polymeric articles made from oriented polymeric strands, and in particular to an improved process for making such articles.

BACKGROUND OF THE INVENTION

In recent years, developments have been made in processes for compacting polymeric strands in order to make sheets of high stiffness and strength. An example is disclosed in GB 2253420A, in which an assembly of strands of an oriented polymer is hot compacted in a two-step process to form a sheet having good mechanical properties. The process involves an initial step in which the strands are brought to and held at the compaction temperature whilst subject to a pressure sufficient to maintain the strands in contact, and thereafter compacted at a high pressure (40-50 MPa) for a few seconds (the compaction pressure). In this process a proportion of the surfaces of the strands melts and subsequently recrystallises on cooling. This recrystallised phase binds the strands together, resulting in good mechanical properties of the final sheet. It is mentioned in GB 2253420A that the process can be applied to many types of oriented polymer including polyester and PEEK (polyether ether ketone) but that preferred polymers are oriented polyolefins.

One drawback of the process described in GB 2253420A is that the temperature span across which melting occurs is very narrow. Accordingly it is difficult to achieve the desired degree of partial melting of the outer regions of the strands. Inadequate melting of the strands results in poor mechanical properties. Excessive melting of the strands results in loss of orientation, and diminished mechanical properties. Precise process control is needed if the article is not to be "under-melted" or "over-melted".

In WO 98/15397 a related process is disclosed in which an assembly of melt-formed polyolefin strands is maintained in intimate contact at elevated temperature sufficient to melt a proportion of the strands, whilst being subjected to a compaction pressure of no greater than 10 MPa. If wished the strands may have been subjected to a prior crosslinking process, preferably an irradiation crosslinking process comprising irradiating the strands with an ionising radiation in an inert environment containing alkyne or diene compounds, and then carrying out an annealing step comprising annealing the irradiated polymer at an elevated temperature, in an inert environment containing alkyne or diene compounds. It is said that the prior crosslinking can make the compaction temperature less critical, and improve mechanical properties, in particular the failure strength at elevated temperature.

There is published work on the use of articles in which a polyethylene film is sandwiched between polyethylene fibre layers, and the ply subjected to hot compaction.

Marais et al., in Composites Science and Technology, 45, 1992, pp. 247-255, disclose a process in which compaction takes place at a temperature above the melting point of the film but below the melting point of the fibre layers. The resulting articles have modest mechanical properties.

Ogawa et al., in Journal of Applied Polymer Science, 68, 1998, pp. 1431-1439 describe articles made up of layers of ultra-high molecular weight polyethylene fibres (mp 145-152° C.) and low density polyethylene films (mp 118° C.). The moulding temperature is said to be between the melting points of the fibre and the interlayer (matrix). The volume fraction of the fibres is stated to be 0.69 or 0.74. However the articles are said to have surprisingly poor properties, possibly because of weak adhesion between fibres and matrix (melted film) Another article was made with polyethylene fibres alone, and the process conditions induced partial melting, with poorer properties.

SUMMARY OF THE INVENTION

There is a need for a simple, practical means which can reduce the criticality of the compaction temperature, in a hot compaction process. There is in addition a continuing need for improvement in mechanical properties in the resulting articles. It is an object of the present invention to achieve embodiments in which one or both of these needs are met, at least in part, in a practicable manner.

Accordingly in a first aspect of the present invention there is provided a process for the production of a polymeric article, the process comprising the steps of:

(a) forming a ply having successive layers, namely (i) a first layer made up of strands of an oriented polymeric material;

(ii) a second layer of a polymeric material;

(iii) a third layer made up of strands of an oriented polymeric material, wherein the second layer has a lower peak melting temperature than that of the first and third layers;

(b) subjecting the ply to conditions of time, temperature and pressure sufficient to melt a proportion of the first layer, to melt the second layer entirely, and to melt a proportion of the third layer; and to compact the ply; and (c) cooling the compacted ply.

"Cooling" in the first and second aspects can include permitting the compacted ply to cool naturally; forced draught cooling; plunge cooling; any other type of accelerated cooling; and retarded cooling.

The term "strands" is used herein to denote all oriented elongate elements of polymeric material useful in this invention. They may be in the form of fibres or filaments. They may be in the form of bands, ribbons or tapes, formed for example by slitting melt formed films, or by extrusion. Whatever their form the strands may be laid in a non-woven web for the process of the invention. Alternatively they may be formed into yarns comprising multiple filaments or fibres, or used in the form of a monofilament yarn. The strands are usually formed into a fabric by weaving or knitting. Optionally the strands may have been subjected to a crosslinking process, as described in WO 98/15397. Woven fabrics are preferably made up of tapes, fibre yarns or filament yarns, or they may comprise a mixture of fibre or filament yarns and tapes. Most preferred for use in the said first and third layers are fabrics which are woven from flat tapes, as this geometry is believed to give the best translation of the oriented phase properties into the properties of the final compacted sheet.

The strands can be made by any suitable process, for example solution or gel or melt forming, preferably by melt forming.

Preferably at least 1% of each of the first layer melts, preferably at least 3%, more preferably at least 5%. Especially preferred are embodiments in which at least 10% of the first layer melts (vol/vol of first layer).

Preferably not more than 30% of the first layer melts, more preferably not more than 25%. Highly preferred are embodiments in which not more than 20% of the first layer melts, and especially not more than 15% (vol/vol of the first layer).

Preferably at least 1% of each of the third layer melts, preferably at least 3%, more preferably at least 5%. Especially preferred are embodiments in which at least 10% of the third layer melts (vol/vol of third layer).

Preferably not more than 30% of the third layer melts, more preferably not more than 25%. Highly preferred are embodiments in which not more than 20% of the third layer melts, and especially not more than 15% (vol/vol of the third layer).

Preferably at least 1% of the ply melts, preferably at least 3%, more preferably at least 5%, and most preferably at least 10% (vol/vol of total ply).

Preferably not more than 35% of the ply melts, preferably not more than 25%, more preferably not more than 20%, and most preferably not more than 15% (vol/vol of total ply).

Preferably the ply comprises a plurality of layers of the type defined above as the second layer, for example from 2 to 40, preferably from 4 to 30, each such layer being sandwiched between layers of the type defined above as the first and third layers.

In certain embodiments of the invention the strands of an oriented polymeric material of the first and third layers may comprise—preferably may consist of—polyethylene, polypropylene, polyoxymethylene or polyester, including as homopolymer, copolymer or terpolymer. Polymer blends and filled polymers could be employed in certain embodiments. In especially preferred embodiments the strands are of a homopolymeric material, most preferably a polypropylene or polyethylene homopolymer.

In certain embodiments of the invention the or each second layer may comprise—preferably may consist of—polyethylene, polypropylene, polyoxymethylene or polyester, including as homopolymer, copolymer or terpolymer. Polymer blends and filled polymers could be employed in certain embodiments. In especially preferred embodiments the or each second layer is of a homopolymeric material, most preferably a polypropylene or polyethylene homopolymer.

Preferably the first and third layers are of the same type of polymeric material (e.g., both polypropylene). Preferably the second layer is of the same type of polymeric material. Most preferably the second layer is of the same chemical composition and grade, except for the fact that it is preferably of lower orientation (and accordingly melts at a lower temperature than the first and third layers).

The minimum temperature at which the fibres should be compacted is preferably that at which the leading edge of the endotherm, measured by Differential Scanning calorimetry (DSC), of the constrained polymer fibres extrapolated to zero intersects the temperature axis. Preferably, the temperature at which the fibres are compacted is no greater than the constrained peak temperature of melting at the ambient compaction pressure—i.e. the temperature at which the endotherm reaches its highest point.

The second layer could be formed in situ on the first or third layer, for example by delivering the polymeric material of the second layer to the respective first or third layer in particulate form, for example by spraying.

Alternatively, and preferably, the second layer is preformed, and is laid onto the first or third layer. The second layer could be pre-formed from strands of the polymeric material. The strands could be laid into a non-woven web. They could be formed into yarns comprising multiple filaments or fibres, or used in the form of a monofilament yarn. Strands—for example filament yarns, fibre yarns or tapes—could be formed into a fabric by weaving or knitting. Most preferably, however, the second layer comprises—preferably consists of—a film. The film may typically have a uniaxial or biaxial orientation resulting from its formation, but such that the degree of orientation will typically be much less than that of the strands which make up the first and third layers. The or each second layer may be made up of a plurality of films, for example 2-5, but is preferably constituted by a single film.

Preferably the or each second layer (however constituted) is of thickness not exceeding 100 µm, more preferably not exceeding 40 µm, and most preferably not exceeding 20 µm (with reference to its thickness when under compression in the ply, at a temperature below its melting temperature).

Preferably the or each second layer (however constituted) is of thickness at least 5 µm, more preferably at least 10 µm (with reference to its thickness when under compression in the ply, but below its melting temperature).

Preferably the thickness of each of the first and third layers exceeds that of the or each second layer. Preferably the thickness of each is at least 5 times that of the or each second layer.

Preferably the thickness of each of the first and third layers exceeds 50 µm, and more preferably exceeds 100 µm.

Preferably the thickness of each of the first and third layers does not exceed 1 mm, and preferably does not exceed 400 µm.

Preferably the or each second layer has a peak melting temperature at least 5° C. lower than the peak melting temperature of the first and third layers, more preferably at least 10° C. lower, most preferably at least 20° C. lower.

It is preferred that the hot compaction process of the invention uses a compaction pressure not exceeding 10 MPa. It is also preferred that a single pressure is used throughout the hot compaction process. Most preferred pressures are between 1 and 7 MPa, particularly between 2 and 5 MPa. It is preferred that the hot compaction pressure is maintained during cooling.

Preferably the polymeric materials have not been subjected to a crosslinking process prior to compaction, for example of the type described in WO 98/15397. It is found that the present invention gives benefits in terms of the "temperature window" without the need for crosslinking.

Preferably the polymeric materials have not been subjected to a prior corona discharge treatment prior to compaction. More preferably the polymeric materials have not been subjected to surface treatment prior to compaction.

Compaction of the polymeric materials may be carried out in an autoclave, or in a double belt press or other apparatus in which the assembly is fed through a compaction zone where it is subjected to the required elevated temperature and pressure. Thus, the process may be operated as a continuous or semi-continuous process. Cooling is preferably effected whilst the compacted web is restrained against dimensional change, for example by being held under tension, which may be applied uniaxially or biaxially, or by being still under a compaction pressure. The restraint may assist the maintenance of good properties in the oriented phase.

The article may be regarded as a polymer composite made up of an interlayer or binding phase produced during the process, derived from full melting of the second layer and partial melting of the first and third layers, and an oriented phase, being the unmelted major proportion of the fibres of the first and third layers.

By means of the present invention articles can be made with certain mechanical properties exceeding those which would be obtained using a conventional process which does not employ a melted second layer. In particular peel strength and failure strength may be significantly improved, with tensile modulus being maintained at a good level.

In accordance with a second aspect of the present invention there is provided an article made by a process of the first aspect.

Articles made by the process of the present invention are suitable for forming into shape, by a process carried out subsequent to compaction (post-forming).

In accordance with a third aspect of the present invention there is provided a process for forming a shaped article by the application of heat and a shaping force to an article of the third aspect of the present invention. Suitably the article of the third aspect may be a flat sheet and the shaped article may, for example, be bent, curved, domed or otherwise non-planar.

In accordance with a fourth aspect of the present invention there is provided an article formed into a shape by a process of the third aspect.

In accordance with a fifth aspect of the present invention there is provided a ply as defined by step (a) of the first aspect, prior to the carrying out of steps (b) and (c) of the first aspect.

BRIEF DESCRIPTION OF THE DRAWINGS

The invention will now be described in more detail with reference to the accompanying drawings, in which.

DETAILED DESCRIPTION OF THE INVENTION

Figure 1:
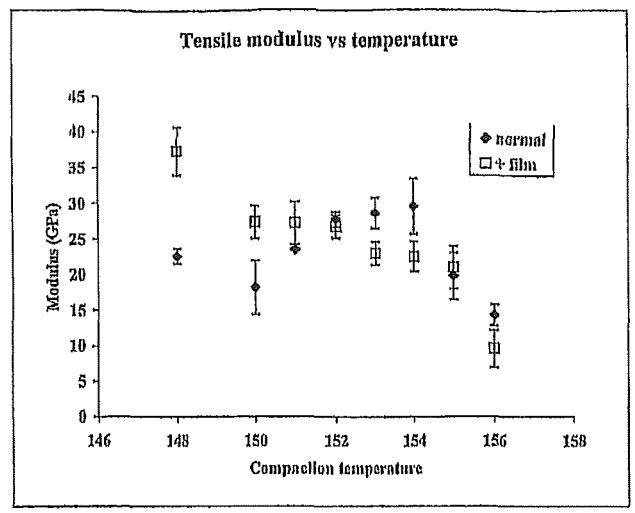
FIG. 1 is a graph of tensile modulus versus temperature.

The invention will now be further exemplified, with reference to the following examples, set out in sets.

In these examples standard test methods were used.

Tensile modulus and tensile strength were determined following the protocols of ASTM D638. Flexural strength was determined following the protocols of ASTM D790.

Peel strength was determined by the protocols of the T-Peel test, ASTM D1876. Samples for testing were 10 mm wide and 100 mm long and were tested using a crosshead speed of 100 mm/min. The testing was carried out parallel to the warp direction.

In all cases three samples were tested and the results averaged.

The percentage of material melted was determined by Differential Scanning calorimetry (DSC) carried out at a heating rate of 10° C./min.

Example Set A

Fabric layers were woven, in a plain weave, from CERTRAN, a 250 denier multifilament yarn of melt spun filaments of oriented homopolymeric polyethylene available from Hoechst Celanese, and characterised as follows:

TABLE 1

| Molecular weight | | Breaking strength (GPa) | Tensile initial secant (GPa) | Modulus 2% (GPa) |
| --- | --- | --- | --- | --- |
| (Mw) | (Mn) | | | |
| 130,000 | 12,000 | 1.3 | 58 | 43 |

Samples, using two layers of woven cloth, were processed in a hot press using a two stage pressure process. An initial pressure of 0.7 MPa (100 psi) was applied while the assembly reached the compaction temperature. After a 2 minute dwell time at this temperature, a higher pressure of 2.8 MPa (400 psi) was applied for 1 minute upon which time the assembly was cooled at a rate of approximately 20° C. per minute to 100° C. Samples were made under three conditions. Firstly, standard compaction at a temperature of 138° C. Secondly, a layer of the LDPE film was laid between the two layers of woven cloth and then processed at 126° C. (above the melting point of the film but below the melting point of the oriented fibres) Finally a sample was made by interleaving one layer of the LDPE film between the two layers of woven cloth and processing at a temperature of 136° C.

The results of these tests are shown in the table below.

TABLE 2

| Sample | Compaction temperature (° C.) | % fibre melted material | Peel strength (N/10 mm) | Tensile modulus (GPa) |
|---|---|---|---|---|
| Standard compaction technique (comparison) | 138 | 26 | 7.2 | 9.2 |
| Woven PE cloth + interleaved LDPE film (comparison) | 126 | 0 | 6.8 | 3.1 |
| Woven PE cloth + interleaved LDPE film | 136 | 14 | 11.2 | 8.1 |

For the standard compaction technique without the film, a compaction temperature of 138° C. was found to be optimum for giving a good modulus and reasonable level of interlayer bonding (peel strength). This optimum temperature was very close to the point where major crystalline melting occurred, at 139° C. Using an interleaved film, but processing at 126° C., just enough to completely melt the interlayer film, but not the surfaces of the fibres, good interlayer bonding was developed but modulus was poor due, presumably, to poor interfibre bonding as it will be difficult for the molten material to penetrate the fibre bundles. Finally, the sample made with the interlayer film but processed at 136° C., where selective melting of the oriented fibres occurred, shows the highest peel strength and a good modulus. In addition, those properties were obtained at a temperature 2° C. below the temperature required for compaction without the film, widening the processing window as there is less risk of over melting at a temperature of 139° C.

Example Set B

In these examples partially melted monolithic articles were prepared, using TENSYLON oriented polyethylene tape produced by Synthetic Industries, USA, having the following characteristics:

TABLE 3

| Tensile strength | 1.5 GPa |
|---|---|
| Tensile modulus | 88 GPa |
| Denier | 720 |

This was woven into a fabric. For the interlayer a polyethylene of closely similar type was obtained, FL5580 film grade from Borealis A/S, Denmark, melting point 130° C. This was extruded into a film approximately 10-15 µm in thickness, using a standard film extruder and film die.

Compaction experiments were carried out at a range of temperatures between the melting point of the film (approximately 130° C.) up to and including the normal compaction range for this material (148°-156° C.). The woven cloth was thin (areal density 83 g/m²) and to obtain an even pressure over the assembly during compaction rubber sheets were used inside the normal metal plates utilised for compaction, with soft aluminum foils between the rubber sheets and the ply being compacted. Dwell time was 5 minutes. Cooling was 20° C./min.

Figure 2:
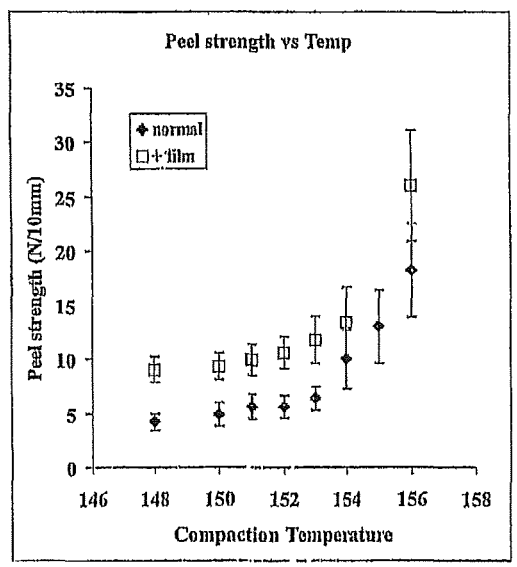
FIG. 2 is a graph of peel strength versus temperature.
Figure 3:
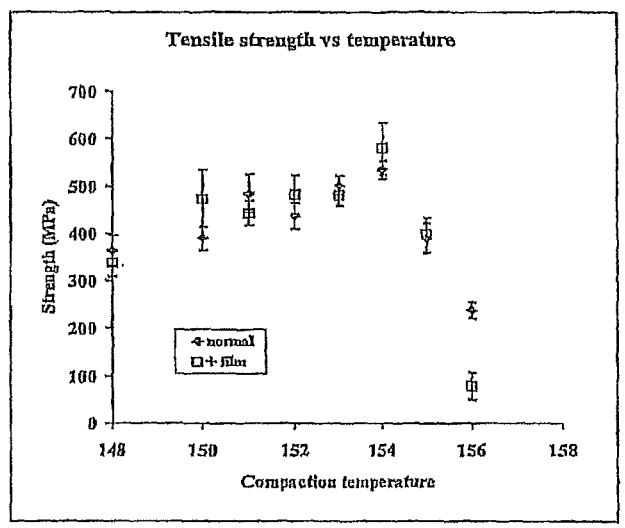
FIG. 3 is a graph of tensile strength versus temperature.

In the first series of tests, samples were compacted over the temperature range 148 to 156° C., with and without the interleaved film. FIGS. 1, 2 and 3 show the tensile modulus, peel strength and tensile strength of these samples.

It will be seen from FIG. 1 that when an interlayer is used, the tensile modulus shows a monotonic decrease with temperature, as opposed to the peak seen with normal compaction. We infer that the interlayer is producing higher levels of bonding at low compaction temperatures making the properties less sensitive to the amount of melted material produced.

The peel strength of the interleaved film samples (FIG. 2) is higher throughout the temperature range, compared to normal compaction.

The tensile strength (FIG. 3) was similar for the two samples; concern that this property might be compromised by use of the interlayer was allayed.

Figure 4:
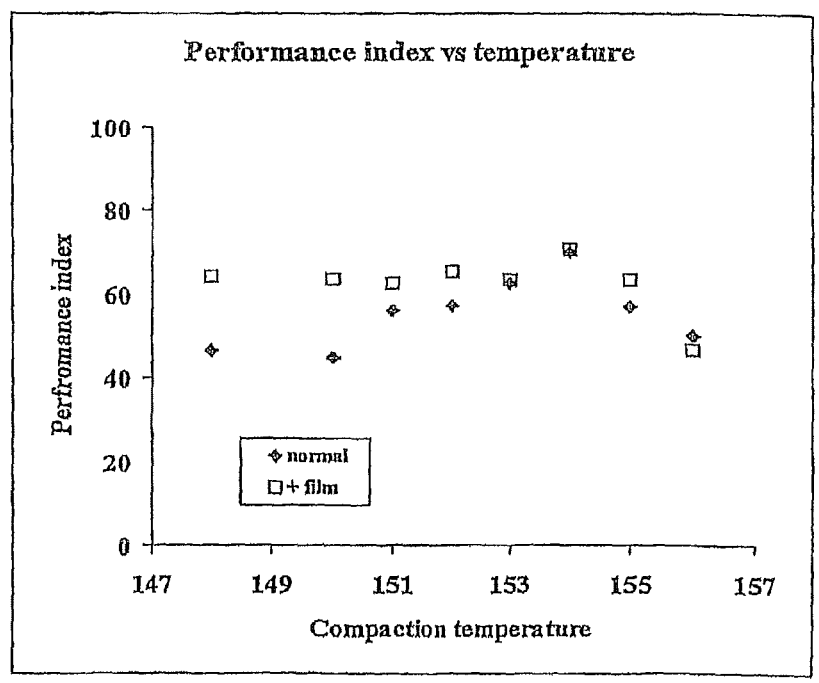
FIG. 4 is a graph of performance index versus temperature.

We have developed a performance index (PI) in an attempt to discern the optimum combination of the compacted sheet properties. If we consider the tensile modulus E, the tensile strength c and the peel strength, Peel, assuming each property is equally important, this is defined as follows:

$$PI=100\times[(E_T/E_{max})+(\sigma_T/\sigma_{max})+(Peel_T/Peel_{max}]/3$$

where the subscript T refers to a particular compaction temperature and the subscript max refers to the maximum value measured for all the samples. Values of the performance index are shown below in FIG. 4. From this it is seen that the interlayer samples show a less variable combination of properties, in particular having better properties at lower compaction temperatures, than corresponding samples without an interlayer. This confirms the view that a lower compaction temperature can be used when an interlayer is employed, giving processing advantages.

Example Set C

The tests of this example employed the same materials, equipment and techniques as Example Set B. It provides a comparison of the properties of compacted sheets made at three temperatures: a normal compacted sample made at the standard optimum temperature of 154° C., an interlayer sample made at 152° C. and a comparison interlayer sample made at 135° C., which is enough to melt the interlayer but not any part of the TENSYLON tapes. The results are shown below.

TABLE 4

| Sample configuration | Assembly temperature (° C.) | Peel strength (N/10 mm) | Tensile modulus (GPa) | Tensile strength (MPa) |
|---|---|---|---|---|
| Standard compaction technique (comparison) | 154 | 10 +− 2.7 | 29.6 +− 3.9 | 535 +− 55 |
| Woven PE cloth + interlayer | 152 | 10.6 +− 1.5 | 26.8 +− 1.6 | 483 +− 28 |
| Woven PE cloth + interlayer (comparison) | 135 | 5.9 +− 0.9 | 14.5 +− 2.7 | 283 +− 25 |

Compacting at a temperature just above the melting temperature of the interlayer but below the melting range of the oriented tapes (135° C.) gives modest mechanical properties. The sample made at 152° C. with the interlayer shows comparable values of tensile modulus, strength and peel strength, compared with the normal compacted sample made at 154° C. Using the film therefore gives the prospect of lowering the compaction temperature 2° C., increasing the width of the processing window.

Example Set D

Tests were carried out to investigate the impact of using interleaved layers of polypropylene (PP) film in combination with the normal layers of woven PP tapes. The PP film this time was the same polymer grade as used for the drawn and woven tapes. The polymer, grade 100GA02, was obtained from BP Chemicals, Grangemouth, UK.

The film had the following properties:

Mn=78,100
Mw=360,000
Density=910 Kg/m$^3$

It was extruded using a Brabender single screw extruder and a standard film die set to a temperature of 260° C. Extrusion screw and wind up speeds (8 rpm and 4.6 m/min) were chosen such that a film thickness of approximately 15 μm was produced.

The next stage in the study was to manufacture a range of samples, with the film as an interlayer, and without (comparison), to assess the impact of an interlayer on compacted sheet properties. DSC tests, carried out a heating rate of 10° C./min, showed that the peak melting point of the film was 162° C., while the constrained peak melting point of the oriented tapes was 194° C. Compacted samples were therefore made at a temperature of 175° C., high enough to melt the film completely but not high enough to cause any melting of the oriented phase.

The material used was a fabric woven tape, formed from a slit film, draw ratio nominally 10:1, woven in a 6060 style. A single pressure process (4.6 MPa) with a dwell time of 5 minutes was used. Samples were also compacted at 180, 187, 189, 191, 193, 195, 197 and 200° C. Cooling rate was 50° C./min, achieved by passing cold water through the heating platens.

Figure 5:
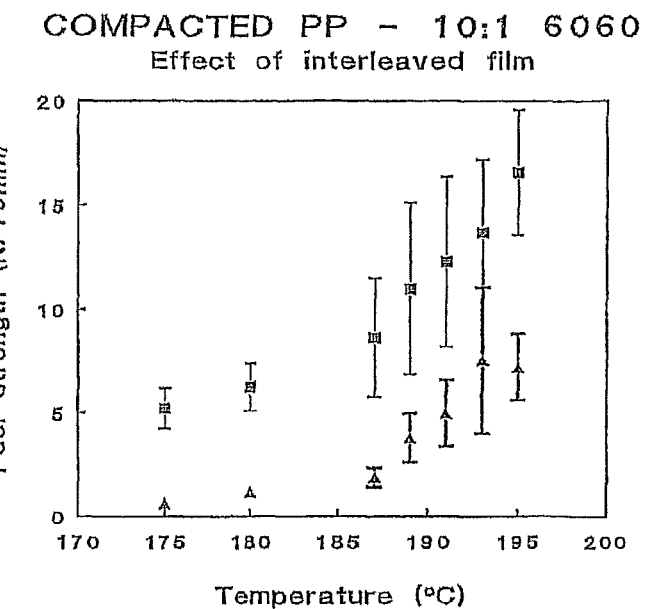
FIG. 5 is a graph of peel strength versus temperature.

In the first set of tests, 4 layer samples were made for measurement of the interlayer bond strength, using the 'T' peel test. The results are given in FIG. 5.

It is seen that at all compaction temperatures, the peel strength is higher when using the interlayer.

The next stage was to measure the stress-strain behaviour of various materials to see if these had been reduced in any way.

Figure 6:
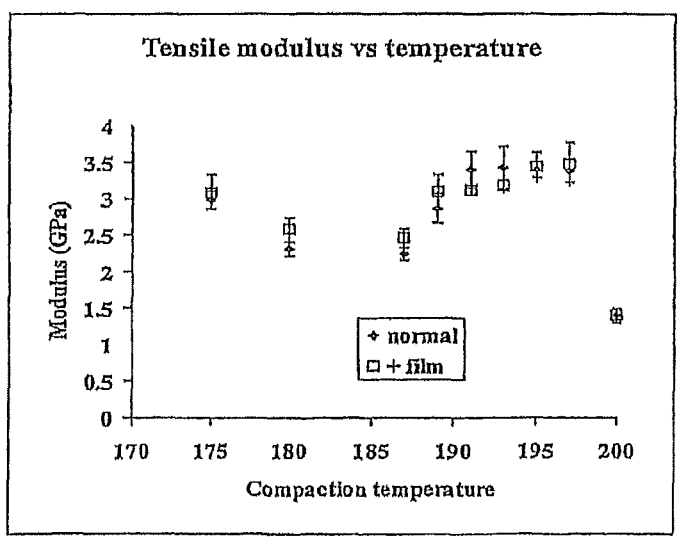
FIG. 6 is a graph of tensile modulus versus temperature.
Figure 7:
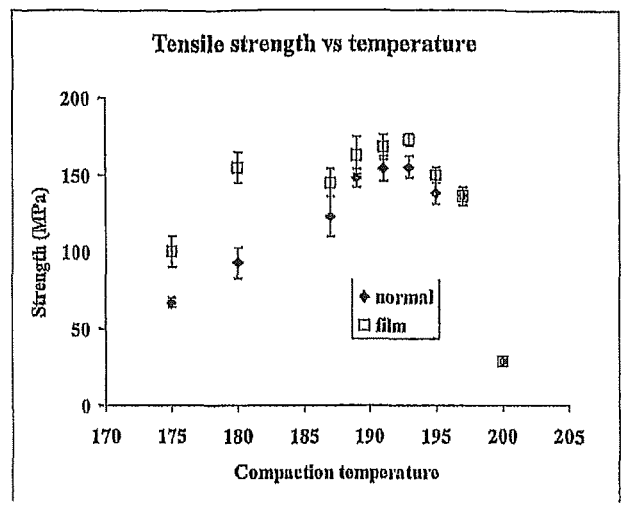
FIG. 7 is a graph of tensile strength versus temperature.

The results are shown in FIGS. 6 and 7.

As shown in FIG. 6, within the experimental scatter no significant difference was seen between the initial tensile modulus of the two groups of samples. The modulus is seen to be relatively constant between 191 and 197° C. for both sets of samples. Thus in this set of tests the introduction of a thin film of material between the woven layers has no discernible detrimental effect on the compacted sample modulus.

For the tensile strength results shown in FIG. 7 there was a clearer difference seen between the two sets of samples. Here the samples made with the film showed a higher tensile strength than those compacted normally. This difference is largest at the lower temperatures when there is little surface melting of the oriented tapes. However, even in the 'optimum' compaction range, the film samples still show a slightly higher tensile strength.

The table below presents a summary of the results from the tensile and peel strength tests (ASTM protocols as noted above), in respect of peel strength, tensile modulus, tensile strength and failure strain.

Figure 8:
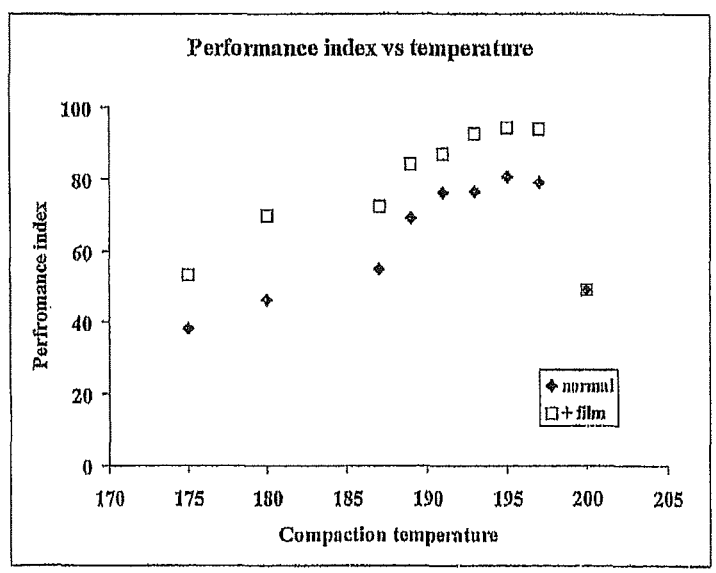
FIG. 8 is a graph of performance index versus temperature.

In an attempt to discern the optimum combination of the four parameters mentioned above, and help assess the impact of the interleaved film, the following performance index (PI) was derived. Assuming each property tested is equally important, this is as follows $$PT=100\times[(E_T/E_{max})+(\sigma_T/\sigma_{max})+(\epsilon_T/\epsilon_{max})+(Peel_T/Peel_{max})]/4$$

where the subscript T refers to a particular compaction temperature and the subscript max refers to the maximum value measured for all the samples. Values of the performance index are also shown in the table below and in FIG. 8. It is seen that the interlayer samples have a better balance of properties compared to the normal samples when analysed in this way, but with the peel strength showing the most marked improvement.

It will be seen that the PI value of the samples made in accordance with the invention, employing a film as interlayer, exceeded the corresponding "no film" value at each given compaction temperature. The best performance was achieved when some melting of the woven fabric took place, notably at a compaction temperature of around 189-197° C. The PI value was higher in the "interlayer" sample.

TABLE 5

| | Compaction temperature (° C.) | Tensile modulus E (GPa) | Tensile strength σ (MPa) | Failure strain ε | Peel strength (N/10 mm) | Performance Index (PI) |
|---|---|---|---|---|---|---|
| No film‡ | 175 | 2.99 | 67 | 5 | 0.63 | 38 |
| | 180 | 2.31 | 93 | 12 | 1.17 | 46 |
| | 187 | 2.24 | 123 | 15 | 1.89 | 55 |
| | 189 | 2.87 | 148 | 18 | 3.7 | 69 |
| | 191 | 3.41 | 154 | 18 | 4.98 | 76 |
| | 193 | 3.43 | 155 | 15 | 7.53 | 77 |
| | 195 | 3.4 | 138 | 21 | 7.2 | 80 |
| | 197 | 3.39 | 137 | 20 | >7.2* | 79 |
| | 200 | 1.4 | 29 | 20 | >7.2* | 49 |
| with film‡ | 175 | 3.09 | 100 | 7 | 5.21 | 53 |
| | 180 | 2.59 | 155 | 16 | 6.23 | 70 |
| | 187 | 2.47 | 145 | 17 | 8.66 | 72 |
| | 189 | 3.1 | 163 | 18 | 11 | 84 |
| | 191 | 3.13 | 168 | 18 | 12.3 | 87 |
| | 193 | 3.18 | 173 | 20 | 13.7 | 93 |
| | 195 | 3.44 | 150 | 19 | 16.6 | 94 |

TABLE 5-continued

| Compaction temperature (° C.) | Tensile modulus E (GPa) | Tensile strength σ (MPa) | Failure strain ε | Peel strength (N/10 mm) | Performance Index (PI) |
|---|---|---|---|---|---|
| 197 | 3.49 | 136 | 20 | >16.6* | 94 |
| 200 | 1.4 | 29 | 20 | >16.6* | 63 |

*samples too well bonded to be tested in peel test
‡comparisons

SEM Images of Polypropylene Peel Fracture Surfaces

The samples compacted at 175, 191 and 193° C. were selected for SEM microscopy of their fracture surfaces following peel testing. The samples were as follows.

TABLE 6

| Sample | Compaction temperature (° C.) | Details |
|---|---|---|
| comparison | 175 | No film |
| comparison | 175 | 1 layer 100GA02 |
| comparison | 191 | No film |
| invention | 191 | 1 layer 100GA02 |
| comparison | 193 | No film |
| Invention | 193 | 1 layer 100GA02 |

The measured peel strengths for these samples are as shown in the Table below.

TABLE 7

| Compaction temperature (° C.) | Without film | With film |
|---|---|---|
| 175 | 0.63 +− 0.12 | 5.21 +− 0.98 |
| 191 | 4.98 +− 1.6 | 12.3 +− 4.1 |
| 193 | 7.53 +− 3.52 | 13.7 +− 3.5 |

Peel fracture loads (N/10 mm)

The associated SEM micrographs are FIGS. 9-18. Comments on these micrographs are as follows.

175° C.—No Film

Figure 9:
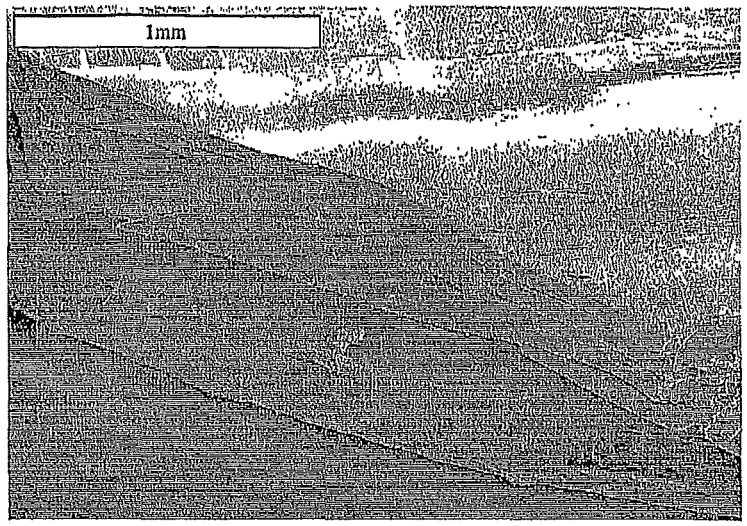
FIG. 9 is a low magnification micrograph (×50) showing the sample edge and fracture structure.

FIG. 9: This is a low magnification micrograph (×50) showing the sample edge and fracture surface. The key point is that at this compaction temperature of 175° C., the tapes and the layers are very poorly bonded.

Figure 10:
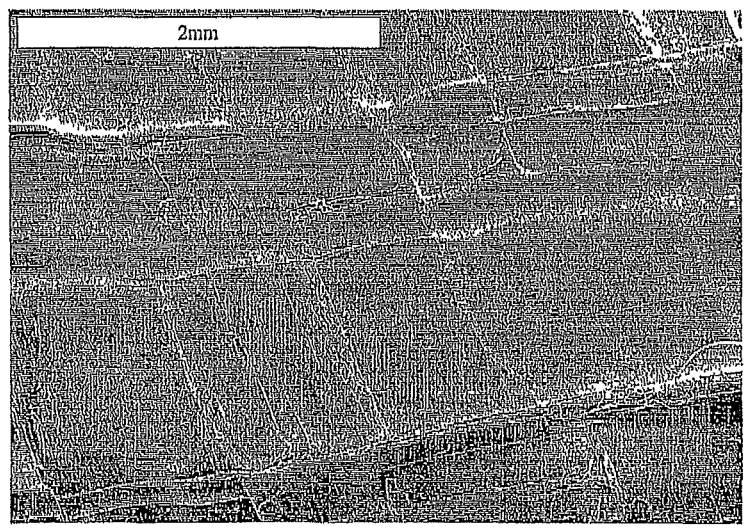
FIG. 10 is a micrograph of the sample of FIG. 9 (×30) showing the peel fracture surface for the sample made at 175° C. without a film.

FIG. 10: This micrograph (×30) shows the peel fracture surface for the sample made at 175° C. without a film There is very little surface damage. As will be seen from the later micrographs, the amount of surface damage correlates very well with the peel strength, as being evidence of the amount of energy needed to separate the surfaces. If the woven layers are poorly bonded, the failure proceeds between the layers causing little damage and a low peel load. If the layers are well bonded, the failure path has to move into the oriented tapes, or the film layer, which increases the peel load and the samples then show a much rougher surface appearance.

175° C.—with Film

Figure 11:
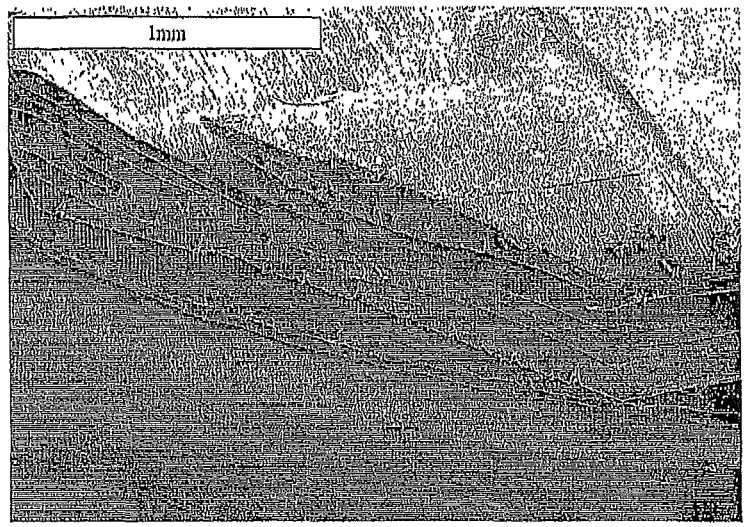
FIG. 11 is a low magnification micrograph (×50) of the sample edge.

FIG. 11: This is a low magnification micrograph (×50) of the sample edge. It is seen again, that at this temperature the layers and tapes are in general poorly bonded.

Figure 12:
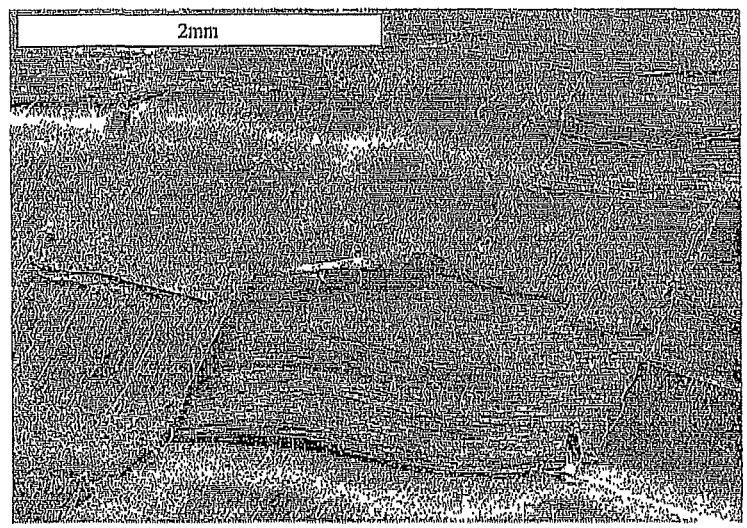
FIG. 12 is a micrograph of the sample of FIG. 11 (×30) showing surface damage associated with the interface where the film was located.

FIG. 12: This micrograph (×30) shows that there is considerable surface damage associated with the interface where the film was located, which correlates with the measured increase in peel strength. However it is also seen that the tapes themselves are not well bonded to those underneath, i.e. where there is no film. To Summarise—175° C. Results Using a film, and processing at a temperature above the film melting point but below the temperature where the oriented tapes melt, gives a structure which is well bonded where the film is present, but poorly bonded elsewhere. It is clear that it would be very difficult for the film to penetrate through the woven tape layers.

Figure 13:
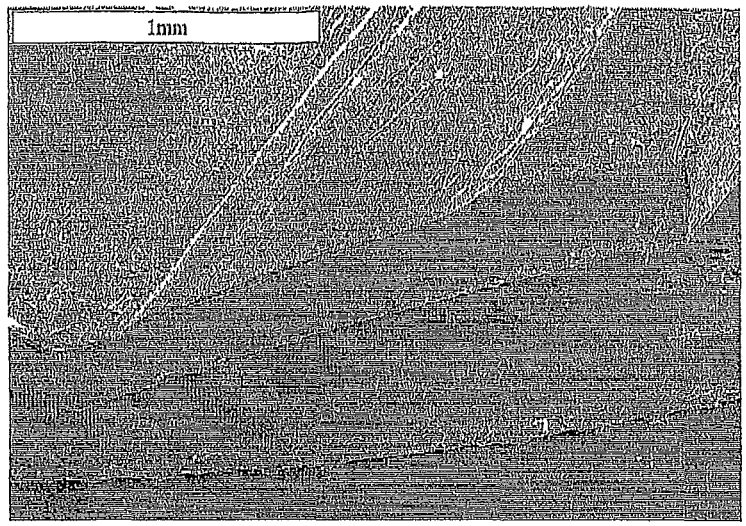
FIG. 13 is a low magnification micrograph (×50) showing the sample edge and fracture surface.

Processing at a temperature well below the melting temperature of the oriented tapes, and using no film, gives poor bonding throughout the structure. 191° C.—no Film FIG. 13: This is a low magnification micrograph (×50) showing the sample edge and fracture surface. The key point is that at this compaction temperature of 191° C., where the surfaces of the oriented tapes are now beginning to melt, the layers are now much better bonded and the compacted sheet is more homogeneous. The individual tapes in the compacted sheet are less apparent than at 175° C. (FIG. 10).

Figure 14:
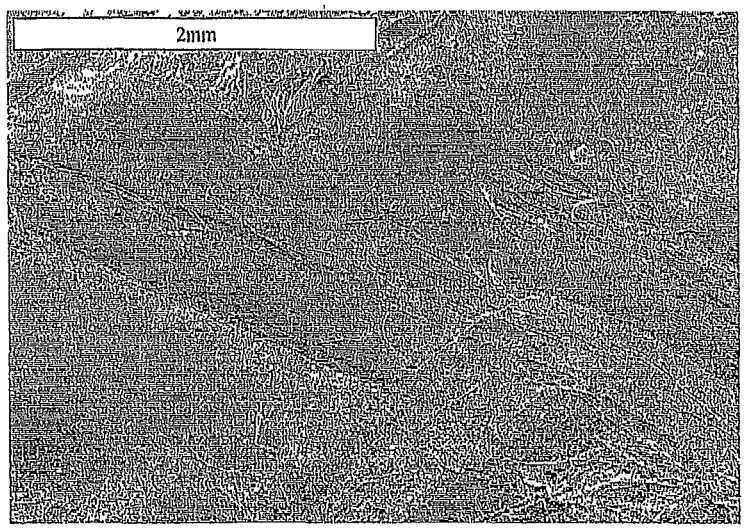
FIG. 14 is a micrograph of the sample of FIG. 13 (×30) showing the peel fracture surface for the sample made at 191° C. without a film.
Figure 15:
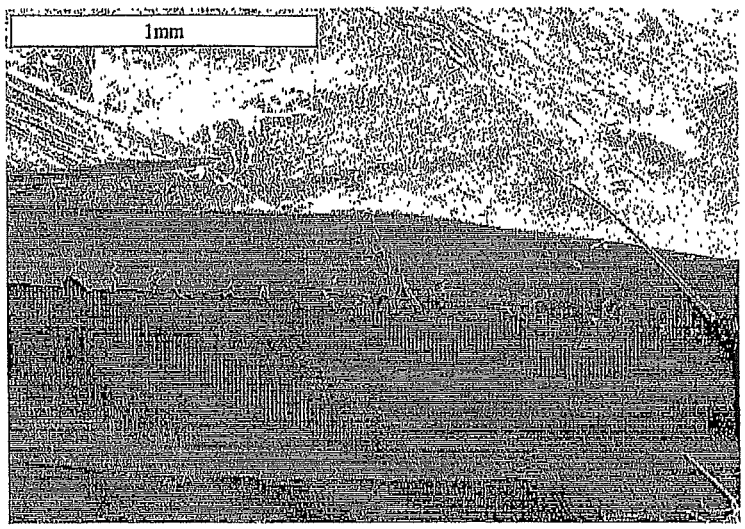
FIG. 15 is a low magnification micrograph (×50) of the sample edge.

FIG. 14: This micrograph (×30) shows the peel fracture surface for the sample made at 191° C. without a film. As would be expected, there is increased surface damage compared to the sample made at 175° C. As with most traditionally compacted samples (i.e. without a film) the surface damage is patchy: there are some regions where the damage is pronounced and others where it is less so. 191° C.—with Film FIG. 15: This is a low magnification micrograph (×50) of the sample edge. It is seen that at this temperature the layers are well bonded; the structure is now homogeneous.

Figure 16:
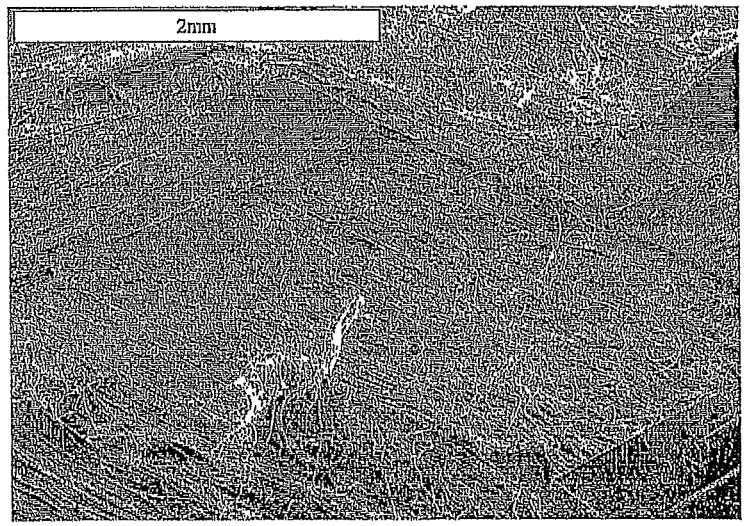
FIG. 16 is a micrograph is the sample of FIG. 15 (×30) showing that a sample made at 191° C. with a film develops surface damaging on peeling.

FIG. 16: This micrograph (×30) shows that a sample made at 191° C. with a film develops a large amount of surface damage on peeling, reflecting the higher peel force measured for this sample. The damage is now seen to be more even across the sample surface. Perhaps the introduction of the film at the interlayer is able to even out any local differences in the way the two woven layers fit together. To Summarise—191° C. Results Using a film, and processing at a temperature where the oriented tapes begin to melt, produces the combination of an overall homogeneous structure and interlayer regions (the weak point in the structure) which are very well bonded.

Figure 17:
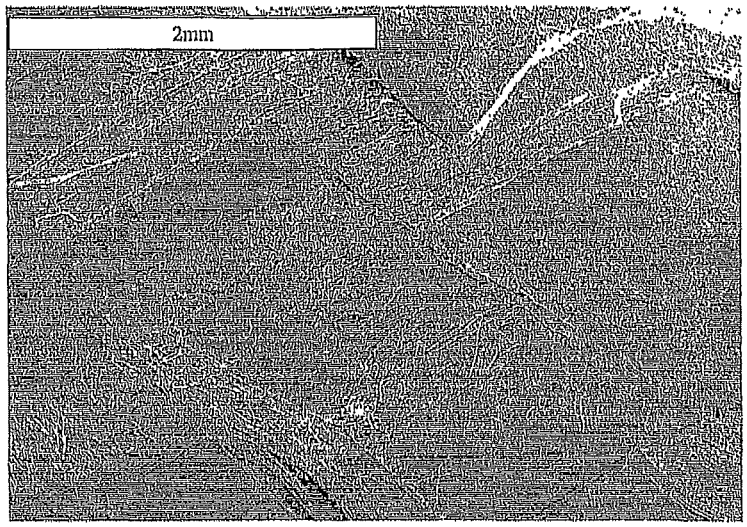
FIG. 17 is a micrograph (×30) showing a peel fracture surface from a sample made at 193° C. without a film.
Figure 18:
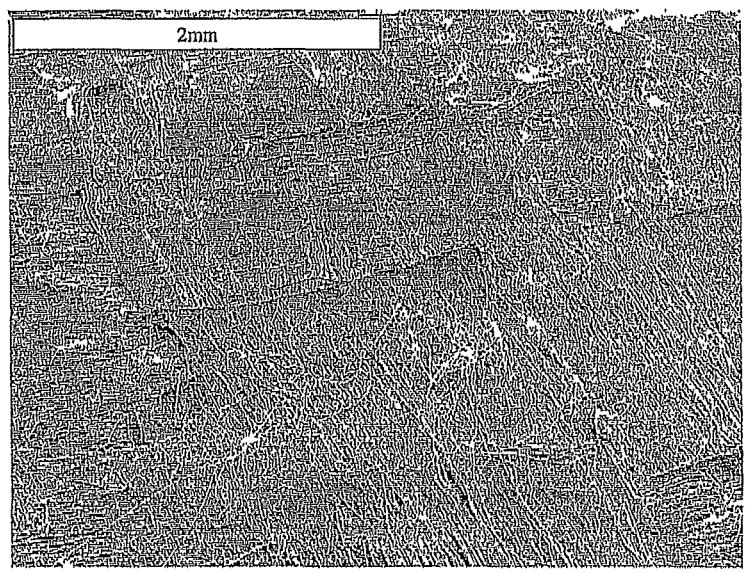
FIG. 18 is a micrograph of the sample of FIG. 17 (×30) showing regions where there has been cohesive failure at the film/tape interface.

The level of damage (i.e. bonding) is more even over the surface when using an interleaved film The level of damage for the sample made at 175° C. with a film is similar to that seen for the sample made at 191° C. without a film, reflecting the similarity in the peel load values. 193° C.—without Film FIG. 17: This shows (×30) a peel fracture surface from a sample made at 193° C. without a film. The fracture surface shows a similar amount of damage to that on the sample made at 191° C. without the film (FIG. 14) but not as much as that on the sample made at 191° C. with the film. The amount of surface damage correlates well with the measured peel loads. As with the sample made at 191° C. without the film, the damage seen over the area is patchy. 193° C.—with Film FIG. 18: This micrograph (×30) which shows regions where there has been cohesive failure within the film and regions of adhesive failure at the film/tape interface. This suggests that the failure could be a combination of these two modes. To Summarise—193° C. Results Using a film, and processing at a temperature where the oriented tapes begin to melt, produces the combination of an overall homogeneous structure and interlayer regions which are well bonded.

The level of damage (i.e. bonding) is more even over the surface when using an interleaved film. It is proposed that the interleaved film is able to more easily fill any gaps which might be present when the woven layers are pressed together.

The level of damage seen on the 193° C. compacted sample fracture surfaces is higher than that on the corresponding 191° C. surfaces (FIGS. 15, 16) reflecting the associated increase in peel strengths.

Example Set E

In this example set the flexural properties of samples compacted at different temperatures, with and without an interlayer, were tested.

The sample preparation was as described previously. The ASTM testing regimes noted above were used.

Figure 19:
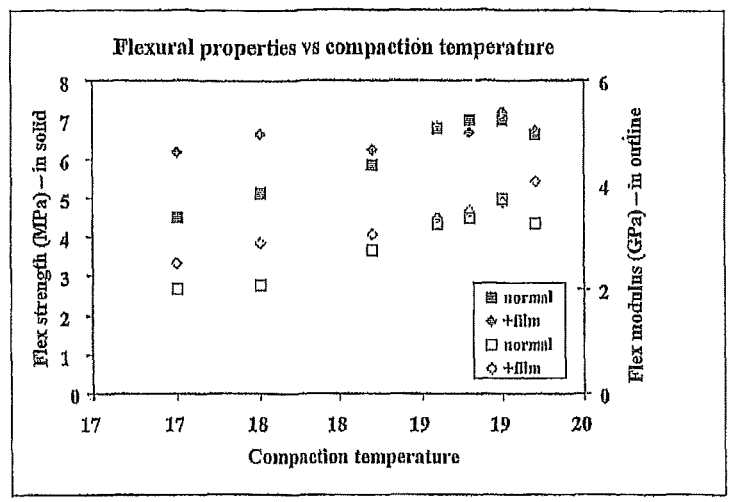
FIG. 19 shows the results for both the flexural modulus and flexural strength for example set E.

FIG. 19 shows the results for both the flexural modulus and flexural strength. Below the onset of selective surface melting of the oriented tapes (about 187° C.), the flexural properties of the interleaved film samples are better than the conventionally compacted samples. Above this temperature, the flexural properties of the two sets of samples are very similar. Flexural properties peak at a compaction temperature of 195° C. for both sets of samples.

Example Set F

In this set of tests effect of interlayer thickness was studied, using the same method and polypropylene material as was used in Example Set D. As with the examples above a film of thickness 10-15 pm was used as an interlayer, with 0-3 such films being used, multiple films being placed together in a stack.

Average values for stress-strain behaviour and peel strength are shown below in the following table.

TABLE 8

| Compaction Temperature (° C.) | Interlayer | Tensile modulus (GPa) | Tensile strength σ (MPa) | Peel strength (N/10 mm) |
| --- | --- | --- | --- | --- |
| 191° C. | No film | 3.41 +− 0.25 | 154 +− 8 | 4.98 +− 1.6 |
|  | 1 layer | 3.13 +− 0.05 | 168 +− 8 | 12.3 +− 4.1 |
|  | 2 layers | 3.17 +− 0.15 | 135 +− 9 | 8.8 +− 1.3 |
|  | 3 layers | 3.00 +− 0.36 | 137 +− 3 | 12.5 +− 4.7 |
| 193° C. | No film | 3.43 +− 0.29 | 155 +− 7 | 7.53 +− 3.52 |
|  | 1 layer | 3.18 +− 0.09 | 173 +− 4 | 13.7 +− 3.5 |
|  | 2 layers | 3.22 +− 0.18 | 144 +− 5 | 9.6 +− 2.3 |
|  | 3 layers | 3.01 +− 0.37 | 160 +− 9 | 11.7 +− 4.3 |

The results indicate that the tensile modulus falls for both temperatures as the film thickness is increased; that the tensile strength peaks for the single layer film thickness and then falls again as the thickness is increased; and that the peel strengths are similar for all layers of film thickness, and all significantly higher than the comparative samples without an interlayer.

The results, taken together, suggest that the single layer is the optimum, giving the maximum increase in peel strength for the minimum loss of tensile modulus, and with retention or slight improvement in tensile strength.

Example Set G

Figure 20:
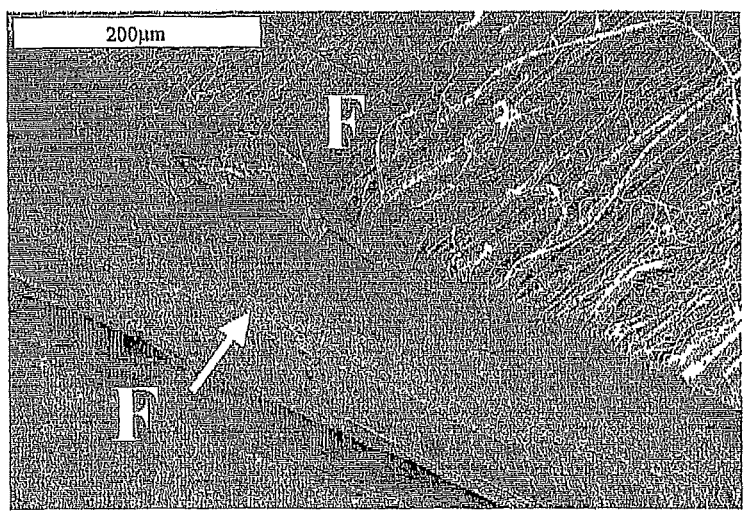
FIG. 20 and FIG. 21 are views of a corresponding peel tested product that have two and three layers of the 100GA02 polymer film, respectively.
Figure 21:
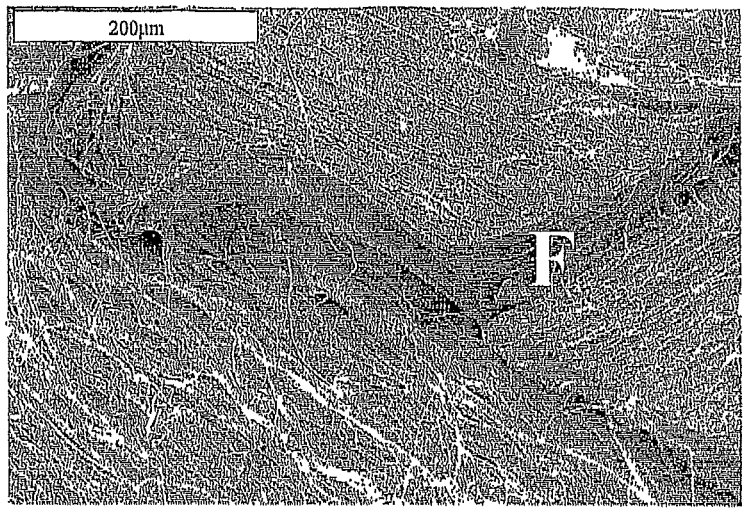
Figure 22:
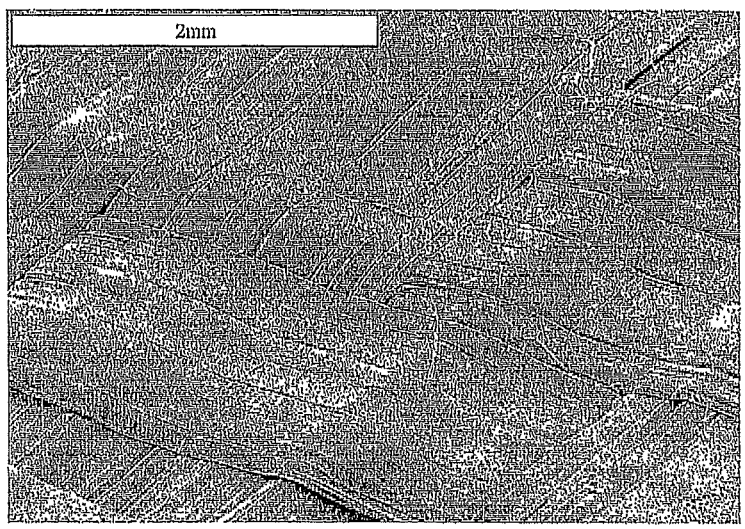
FIGS. 22-25 show low magnification micrographs of typical fracture surfaces from samples made without a film at 135°, 148°, 152°, and 154° C., respectively.
Figure 23:
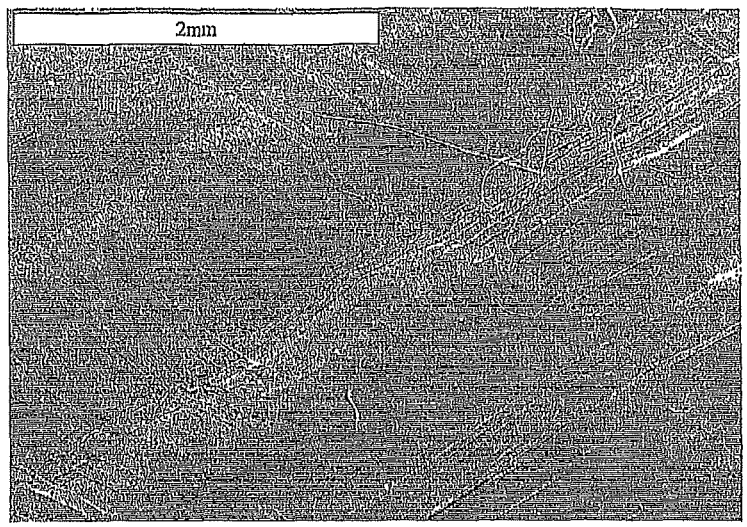
Figure 24:
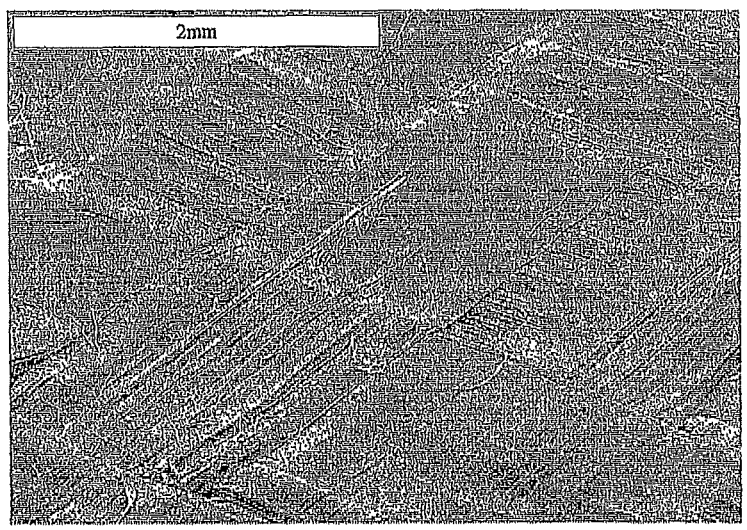
Figure 25:
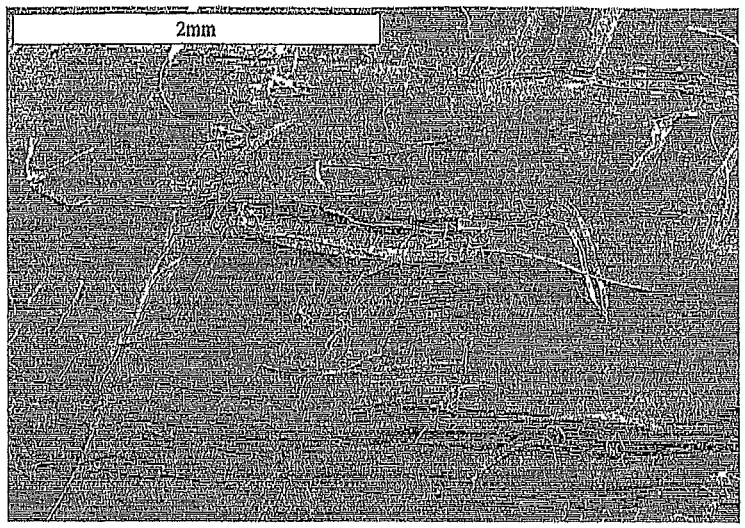
Figure 26:
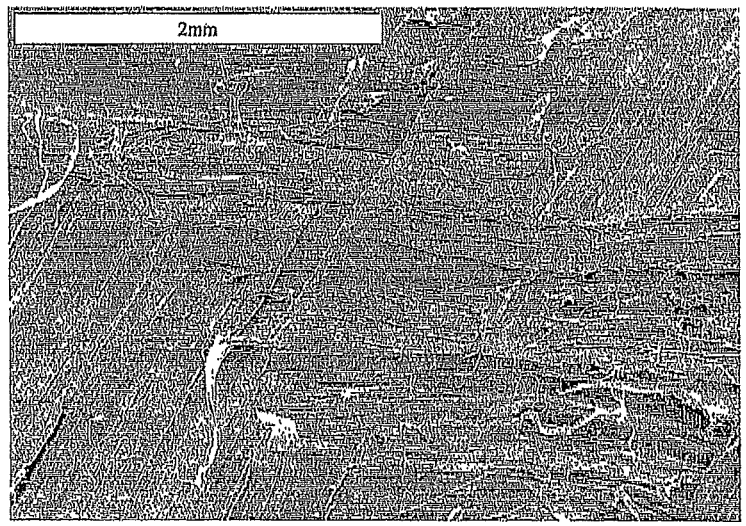
FIGS. 26-29 are four micrographs showing samples made with a film at 135°, 148°, 152°, and 154° C., respectively.
Figure 27:
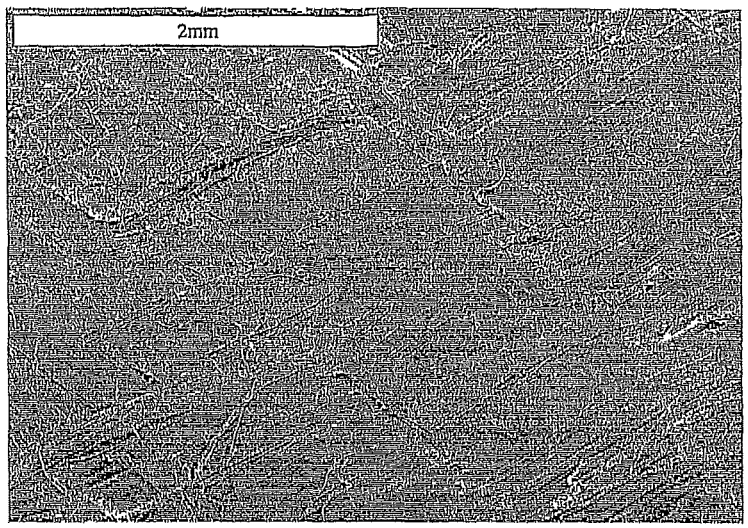
Figure 28:
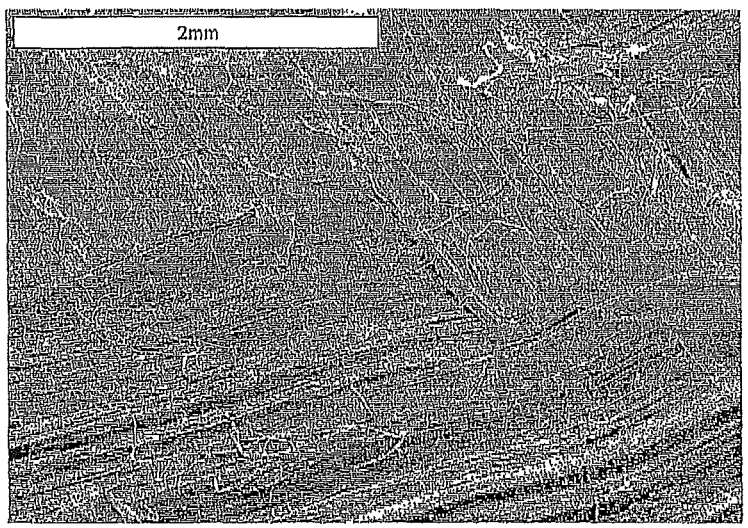
Figure 29:
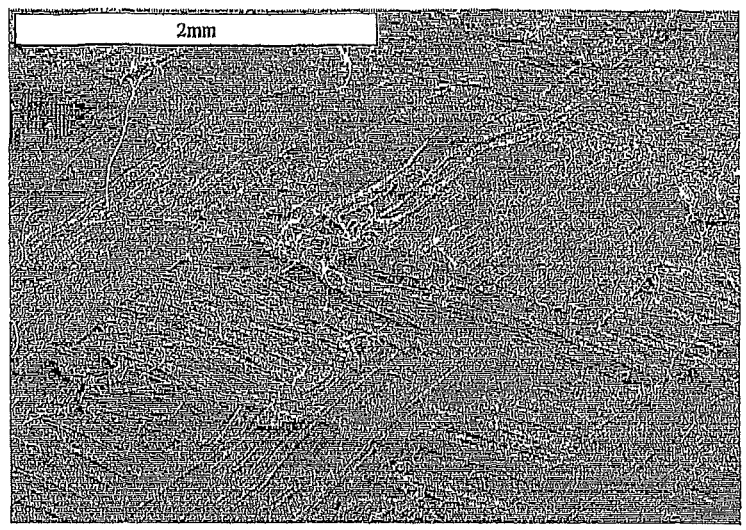
Figure 30:
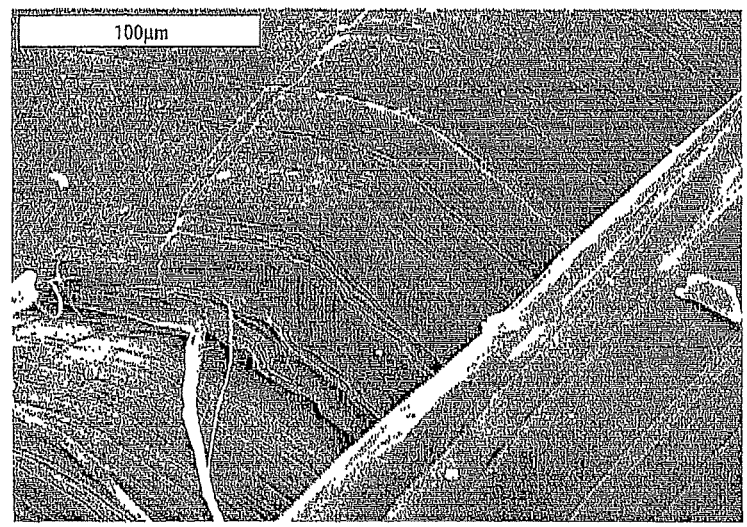
FIG. 30 is at 135° C. with no film.
Figure 31:
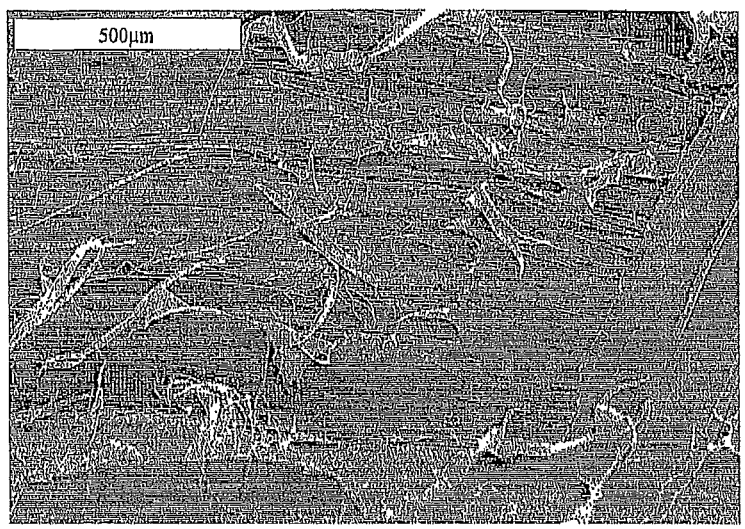
FIG. 31 is at 135° C. with film.

In this example set SEM microscopy was used to study peel fracture surfaces using the same materials and processing as described in Example Set B but having multiple interlayers. The processing temperature was 193° C., so the figures of Example Set D which provide comparisons are FIG. 17 (no film) and FIG. 18 (one layer of film) FIGS. 20 and 21 are views of a corresponding peel tested product, but having two and three layers of the 100GA02 polymer film, respectively. By way of comparison, in the single layer sample of FIG. 18 of Example Set D, one can see the film layers F lying on top of the oriented tapes underneath. In FIG. 20 a sample made with two layers of film the edge of the sample clearly shows the film layer F located within the sample, and the film layer on the peel surface itself. It appears that failure has proceeded at this point predominantly through the film layer. From this micrograph we can see that the damage zone is located within the film layer. FIG. 21 shows a region of the surface showing the thick film layer, now composed of three film layers F. The damage zone is now seen to be much thinner than the overall film thickness.

Example Set H

This example set examined the importance of the type of film used. In some of the tests the interlayer was made from the same polymer as was used to make the oriented tapes (PP 100GA 02 material as described above). In other tests two further interlayer films were investigated, namely.

1) A (30 μm thick) polypropylene film of m.p. 163° C., obtained from ICI.

2) A PE film made in-house: this employed the Brabender single screw extruder and the same film die used to make the PP film described above. This used a BOREALIS PE (Film grade FL5580) and the final extruded film was between 10 and 15 μM thick.

Compaction experiments were carried out using the same woven PP cloth as described above (10:1 drawn tape, 6060 style, 100GA 02 polymer). Experiments were conducted at two compaction temperatures: 175° C., for comparison, enough to melt each film but not enough to melt the surfaces of the oriented materials and 193° C. which is in the optimum value for normal hot compaction The results are shown in the table below.

TABLE 9

|  | E (GPa) | σ (MPa) | ε | Peel strength (N/10 mm) | Sample thickness (mm) | Film thickness μm |
| --- | --- | --- | --- | --- | --- | --- |
| 175° C. no film‡ | 2.99 | 67 | 5 | 0.6 | 0.64 | 10-12 |
| matching PP film‡ | 3.09 | 100 | 7 | 5.2 | 0.64 | 30 |
| ICI PP film‡ | 2.45 | 86 |  | 1.3 | 0.72 | 30 |
| PE film‡ | 2.51 | 92 |  | 0.7 | 0.68 | 10-15 |
| 193° C. no film‡ | 3.43 | 155 | 15 | 7.5 | 0.47 |  |
| matching PP film | 3.18 | 173 | 20 | 13.7 | 0.51 | 10-12 |
| ICI PP film | 3.08 | 103 | 23 | 8.7 | 0.58 | 30 |
| PE film | 2.70 | 113 | 28 | 2.3 | 0.53 | 10-15 |

‡ comparisons

The results indicate that the best samples are those made with the matching PP film.

Example Set I

In this example as assessment was made of the application of the invention to polyester (PET) materials.

Woven PET fabric, and polymer of an identical chemical composition, were supplied by KOSA, GmbH and Co. KG.

The polymer and fabric details were as follows

TABLE 10

| Polymer | Type T51-IV ~0.85, Mn ~22,500 |
|---|---|
| Fabric weight | 200 g/m$^2$ |
| Oriented shape | multifilament bundles 1100 decitex |
| Weave style | Plain weave 9/9 threads/cm |
| Peak m.p. | 250° C. |

PET film (.about.15 μm thick) was cast from the polymer using a standard extruder and a film die. A second PET film, of a different chemical composition to the woven cloth, was also used in these tests: this film was slightly biaxially oriented.

The work reported looked at the application of the invention to the woven PET material, both with and without an interleaved film. Samples were made using both films.

The table below shows a comparison between the stress-strain and peel strength behaviour of samples made with and without the film of the same composition at 257, 258 and 259/260° C. As is seen all the samples made with the film showed increased tensile modulus, tensile strength and peel strength over the samples made without the film, at a given temperature.

TABLE 11

| Compaction temperature (° C.) | Sample | Tensile modulus (GPa) | Tensile strength (MPa) | Peel strength (N/10 mm) |
|---|---|---|---|---|
| 257 | No film‡ | 4.51 +− 0.18 | 88 +− 18 | 1.2 +− 0.2 |
|  | Same film | 5.69 +− 0.52 | 178 +− 16 | 5.1 +− 0.6 |
| 258 | No film‡ | 4.96 +− 0.4 | 120 +− 5 | 2.0 +− 0.4 |
|  | Same film | 6.65 +− 0.69 | 175 +− 5 | 5.9 +− 1.4 |
| 260/259 | No film‡ | 6.41 +− 0.77 | 138 +− 16 | 7.2 +− 1.2 |
|  | Same film | 7.27 +− 0.64 | 188 +− 8 | 6.9 +− 0.9 |

‡comparisons

As a further experiment samples were also made, using a compaction temperature of 257° C., using no film, and both PET films, and tested in the manner described previously. The results are as follows.

TABLE 12

| Samples | Tensile modulus (GPa) | Tensile strength (MPa) | Peel strength (N/10 mm) |
|---|---|---|---|
| No film | 4.51 +− 0.18 | 88 +− 18 | 1.2 +− 0.17 |
| Different film | 6.85 +− 0.32 | 158 +− 13 | 3.9 +− 0.6 |
| Same film | 5.69 +− 0.52 | 178 +− 16 | 5.1 +− 0.6 |

It can be seen that in this experiment the mechanical properties were significantly boosted by the presence of either film; and that the films gave rise to enhancement of different mechanical properties. Namely the tensile modulus of the sample with the different film is higher than with the identical film, although the tensile strength and peel strength are higher with the identical film.

A significant finding is that these mechanical properties were achieved using a compaction temperature of 257° C. The optimum temperature for compacting PET by the prior method (no film) is regarded as 260° C. With PET the processing window is narrow, which could inhibit the commercialisation of hot compaction processes as applied to PET. A lowering of the compaction temperature to 257° C., yet with achievement of good mechanical properties, suggests a significant practical benefit.

Example Set J

SEM Images of Polyethylene Peel Fracture Surfaces

Peel samples were manufactured as described in Example Set B using woven TENSYLON 10:1 PE tapes (6060 style). Samples were made with and without an interleaved film. In these tests a film of the same grade as the oriented tapes was not available and so the Borealis FL5580 material, a similar grade, was sourced.

8 samples were studied, having been compacted at 135° C., 148° C., 152° C. and 154° C., with and without an interlayer film, and subjected to the peel test.

TABLE 13

| Compaction temperature (° C.) | Without Film | With film |
|---|---|---|
| 135 | 0.72 +− 0.31 | 5.94 +− 0.92 |
| 148 | 4.23 +− 0.78 | 9.02 +− 1.18 |
| 152 | 5.56 +− 1.05 | 10.6 +− 1.5 |
| 154 | 10 +− 2.73 | 13.4 +− 3.3 |

Peel fracture loads (N/10 mm)

The associated SEM micrographs are FIGS. 22-37 herein. Comments on these micrographs are as follows.

FIGS. 22-25: These figures show low magnification micrographs of typical fracture surfaces from samples made without a film at 135, 148, 152 and 154° C. respectively. As the compaction temperature is increased the level of surface damage increases. At the lowest temperature, where there is no surface melting of the PE tapes, there is no bonding of the tapes.

At 148° C., where the surfaces of the tapes are just beginning to melt, the tapes appear better bonded although the peel surfaces are clear of damage.

At 152° C. surface damage has increased, reflecting the increase in the measured peel load. As with the PP studies, the areas of surface damage are variable when a film is not used.

At 154° C. the damage is further increased.

FIGS. 26-29:

These four micrographs show samples made with a film at 135, 148, 152 and 148° C. respectively. All show increased surface damage compared to the equivalent samples made at the same temperature. Unlike the PP studies, the film is still visible on some of the fracture surfaces, particularly at 135° C. As the compaction temperature is increased the amount of damage increases. Only at 154° C. is substantial damage seen within the oriented tapes (i.e. at the temperature where there is substantial surface melting of the tapes).

For the other temperatures the failure mode seems to have occurred at the film/woven cloth surface, i.e. at least partial adhesive failure. The best performance is therefore confirmed as a combination of film melting and melting of the tape outer surfaces.

FIG. 30: 135° C.

no film: shows one tape going underneath another at 90° to it, and confirms no bonding between the tapes at this temperature.

FIG. 31:

135° C. with film: this high magnification micrograph shows surface damage and tearing of the interleaved film, but that failure has occurred between the film and the woven layer in some instances.

Figure 32:
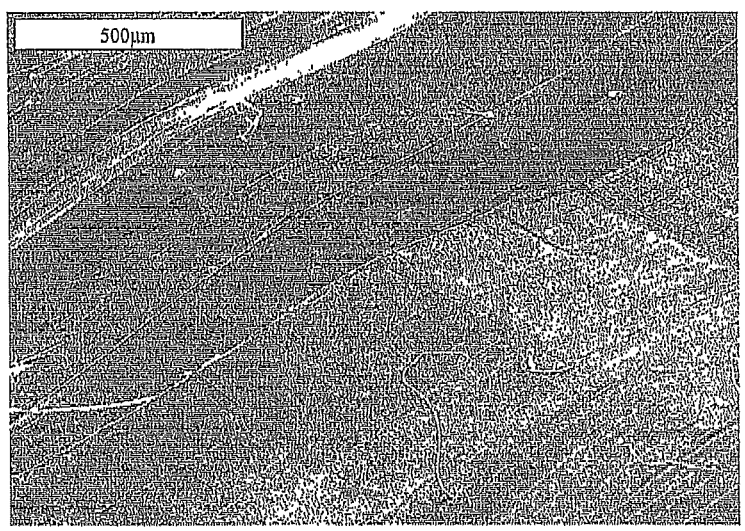
FIG. 32 is at 148° C. with no film.

FIG. 32: 148° C. no film: this micrograph shows a junction between tapes and indicates much better bonding between the tapes. However there is minimal surface damage suggesting the surfaces were fairly easily separated (i.e. low peel strength).

Figure 33:
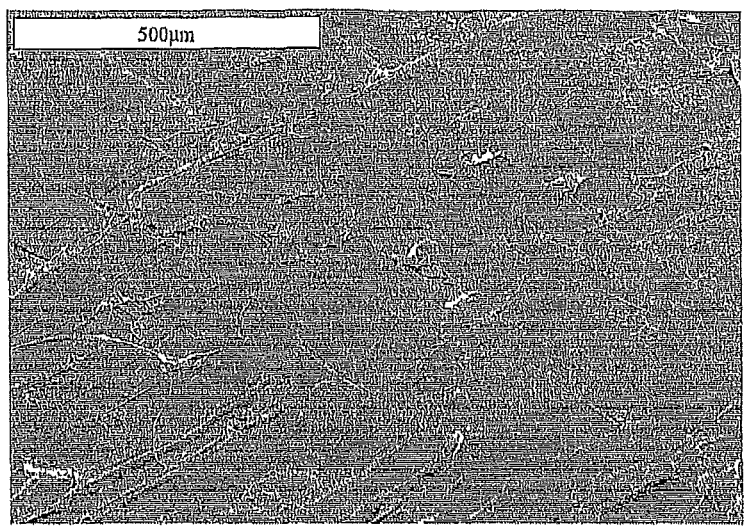
FIG. 33 is at 148° C. with film.

FIG. 33: 148° C. with film: shows increased surface damage but still adhesive failure.

Figure 34:
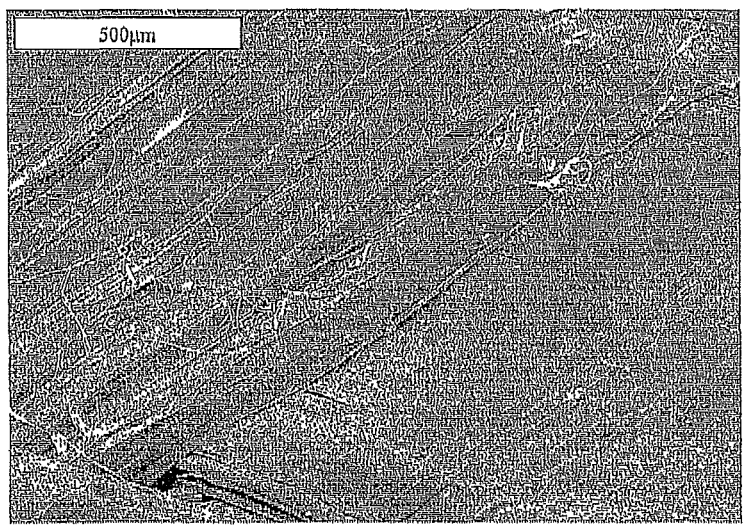
FIG. 34 is at 152° C. with no film.

FIG. 34: 152° C. no film: increased surface damage on this sample compared to the lower temperatures made without a film.

Figure 35:
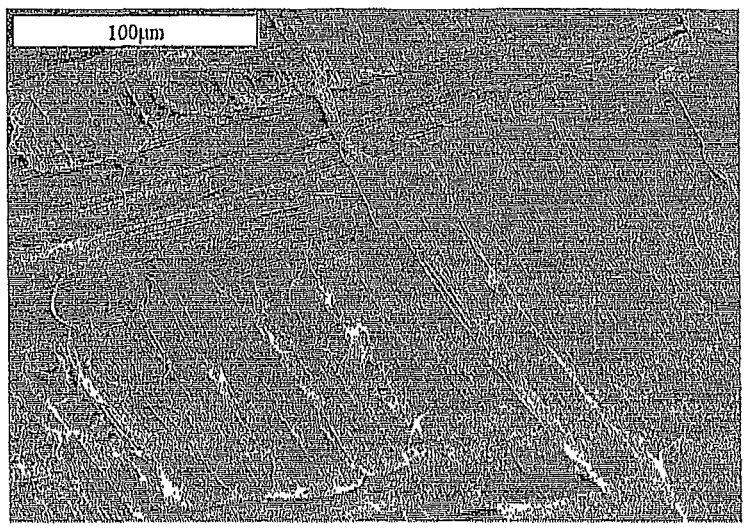
FIG. 35 is at 152° C. with film.

FIG. 35: 152° C. with film: shows adhesive failure.

Figure 36:
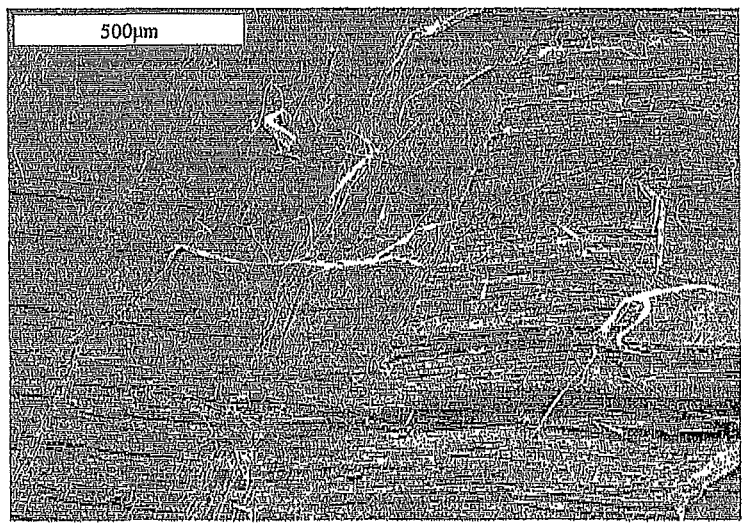
FIG. 36 is at 154° C. with no film.

FIG. 36: 154° C. no film: optimum temperature without a film: substantial damage of the oriented tapes produced during peeling.

Figure 37:
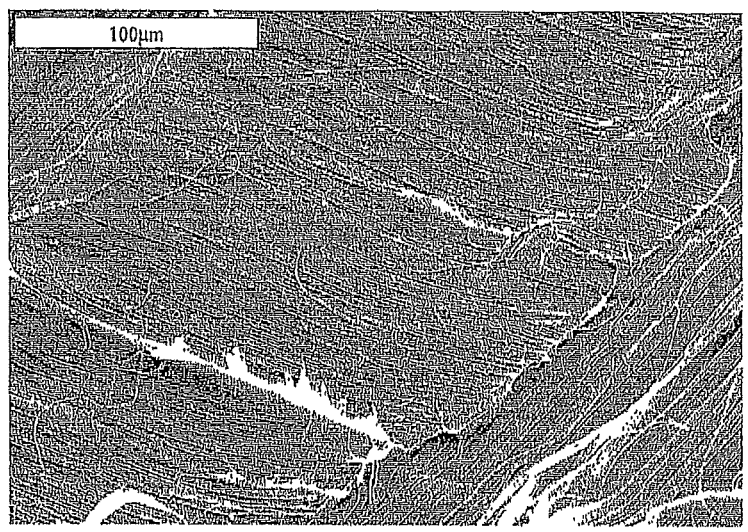
FIG. 37 is at 154° C. with film.

FIG. 37: 154° C. with film: this sample gave the roughest peeled surface seen, which correlates with the highest peel load measured. At this compaction temperature the failure appears to be cohesive. The piece of film on the left shows evidence of material peeled off the adjoining tape on the other surface.

The invention claimed is:

1. A non-planar polymeric article comprising a ply of at least three layers wherein a portion of first and third layers and substantially all of second layer has been melted and wherein the first and third layers of the ply comprise the same type of polymer and the second layer comprises a polymer with the same chemical composition and grade of polymers as the first and third layers with a lower degree of molecular orientation and a lower melting temperature than that of the first and third layers, wherein the first and third layers comprise a thickness of greater than 5 µm but not exceeding 1 mm, and wherein the second layer comprises a thickness of at least 5 µm but not exceeding 100 µm.

2. The polymeric article of claim 1 wherein the first and third layers comprise polyethylene, polypropylene, polyoxymethylene, polyester, blends thereof, or mixtures thereof.

3. The polymeric article of claim 1 wherein the second layer has a melting temperature of at least 5° C. lower than a melting temperature of the first or third layers.

4. A composition comprising at least three distinct, successive layers of unmelted polymeric material wherein first and third layers comprise the same type of polymer and second layer comprises a polymer with the same chemical composition and grade of polymers as the first and third layers with a lower degree of molecular orientation and a lower melting temperature than that of the first and third layers, wherein the first and third layers comprise a thickness of greater than 5 µm but not exceeding 1 mm, and wherein the second layer comprises a thickness of at least 5 µm but not exceeding 100 µm.

5. The composition of claim 4 wherein a layer of unmelted polymeric material comprises a polymer selected from the group consisting of polyethylene, polypropylene, polyoxymethylene, polyester, blends thereof, and mixtures thereof.

6. The composition of claim 4 wherein the thickness of the second layer is less than that of either the first layer or the third layer.

* * * * *